(12) United States Patent
Underwood et al.

(10) Patent No.: US 8,883,000 B2
(45) Date of Patent: Nov. 11, 2014

(54) WATER PURIFICATION APPARATUS AND METHOD

(75) Inventors: Lee Underwood, High Wycombe (GB); Matthew Dobson, Wallingford (GB)

(73) Assignee: VWS (UK) Limited, Marlow Bucks (GB)

( * ) Notice: Subject to any disclaimer, the term of this patent is extended or adjusted under 35 U.S.C. 154(b) by 141 days.

(21) Appl. No.: 13/123,876

(22) PCT Filed: Oct. 14, 2009

(86) PCT No.: PCT/GB2009/051370
§ 371 (c)(1),
(2), (4) Date: Apr. 12, 2011

(87) PCT Pub. No.: WO2010/043899
PCT Pub. Date: Apr. 22, 2010

(65) Prior Publication Data
US 2011/0192476 A1    Aug. 11, 2011

(30) Foreign Application Priority Data

Oct. 16, 2008    (GB) .................................. 0818920.0

(51) Int. Cl.
| | | |
|---|---|---|
| B01D 21/24 | (2006.01) | |
| B01D 21/30 | (2006.01) | |
| F16K 25/00 | (2006.01) | |
| C02F 9/00 | (2006.01) | |
| C02F 1/00 | (2006.01) | |
| F16K 31/04 | (2006.01) | |
| B01L 3/02 | (2006.01) | |
| C02F 1/32 | (2006.01) | |
| C02F 1/42 | (2006.01) | |
| C02F 103/02 | (2006.01) | |

(52) U.S. Cl.
CPC ................. *C02F 9/005* (2013.01); *C02F 1/008* (2013.01); *F16K 31/04* (2013.01); *B01L 3/0293* (2013.01); *C02F 1/32* (2013.01); *C02F 1/42* (2013.01); *C02F 9/00* (2013.01); *C02F 2103/02* (2013.01); *C02F 2209/40* (2013.01); *C02F 2301/02* (2013.01)
USPC ............. 210/109; 210/97; 210/137; 210/143; 210/287; 251/88; 251/310; 251/213

(58) Field of Classification Search
None
See application file for complete search history.

(56) References Cited

U.S. PATENT DOCUMENTS

| 4,433,795 A | 2/1984 | Maiefski et al. |
|---|---|---|
| 4,624,661 A | 11/1986 | Arimond |

(Continued)

FOREIGN PATENT DOCUMENTS

| EP | 0 005 078 | 10/1979 |
|---|---|---|
| EP | 1 457 460 | 9/2004 |

(Continued)

OTHER PUBLICATIONS

Dalmas, Patricia; "Conductivity measurement on pure water according to the recommendations of USP Pharmacopoeia USP24-NF19"; 2000; International Laboratory News; p. 3.*

(Continued)

*Primary Examiner* — Nam Nguyen
*Assistant Examiner* — Richard Gurtowski
(74) *Attorney, Agent, or Firm* — Drinker Biddle & Reath LLP

(57) ABSTRACT

A water purification apparatus comprising at least: (a) one or more water purification components to provide a purified water stream, preferably having a conductivity of less than 1 µS/cm; and (b) a stepper motor (35) to control the dispense of the purified water stream (28) from the water purification apparatus. Stepper motors can provide very fine and accurate control of the dispense of the purified water stream from the water purification apparatus, which control is unaffected by the flow or flow rate of the purified water stream.

7 Claims, 2 Drawing Sheets

(56) References Cited

U.S. PATENT DOCUMENTS

| | | | |
|---|---|---|---|
| 4,911,404 A * | 3/1990 | Dorste et al. ............. 251/129.08 |
| 4,934,566 A | 6/1990 | Guerette | |
| 5,746,241 A | 5/1998 | Stedman | |
| 5,919,357 A * | 7/1999 | Wilkins et al. ................ 210/120 |
| 5,925,240 A | 7/1999 | Wilkins et al. | |
| 6,848,888 B2 | 2/2005 | Du et al. | |
| 7,250,756 B1 | 7/2007 | Hayward et al. | |
| 2005/0016592 A1 * | 1/2005 | Jeromson et al. .......... 137/487.5 |
| 2005/0145650 A1 | 7/2005 | Henry et al. | |
| 2008/0149663 A1 | 6/2008 | Joyce et al. | |

FOREIGN PATENT DOCUMENTS

| | | |
|---|---|---|
| GB | 2 087 838 | 6/1982 |
| GB | 2 354 507 | 3/2001 |
| JP | 06015274 A2 | 7/1992 |
| JP | 2004174485 A2 | 6/2004 |
| WO | WO 03/042586 | 5/2003 |
| WO | WO 2007/015048 | 2/2007 |

OTHER PUBLICATIONS

International Search Report, dated Feb. 2010.
International Preliminary Report on Patentability and Written Opinion, dated Apr. 28, 2011, 7 pages.
Examination Report, Apr. 2, 2013, 6 Pages, from corresponding Japanese application P2011-531569 (English Translation).
English machine translation of JP 06015274A2.
English machine translation of JP 2004174485A2.

* cited by examiner

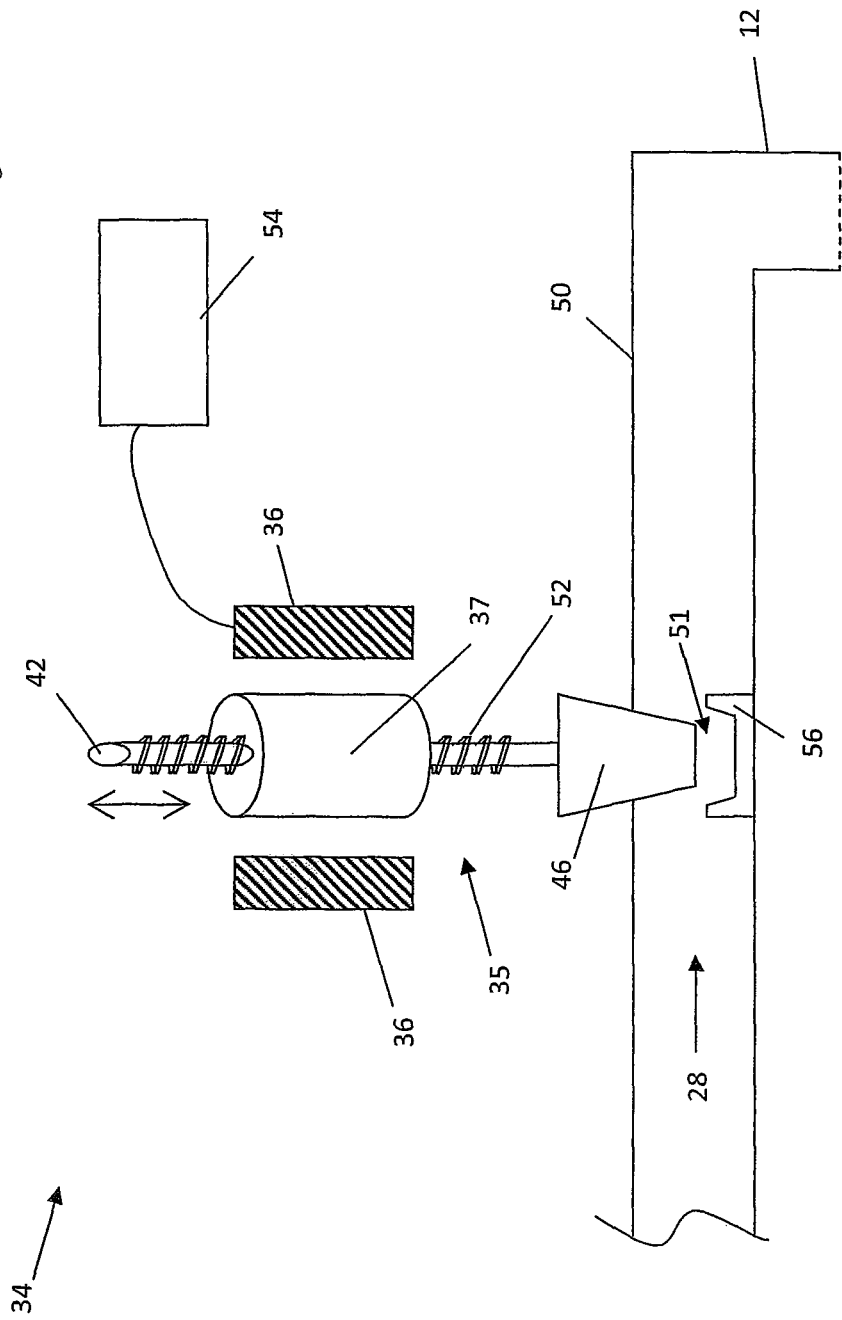

WATER PURIFICATION APPARATUS AND METHOD

FIELD OF THE INVENTION

The present invention relates a water purification apparatus and method, particularly, but not exclusively for laboratory water.

BACKGROUND

Water purification apparatus for use in laboratories and healthcare facilities are well known. Generally they involve the reduction and/or removal of contaminants and impurities to low levels. They typically contain a variety of technologies that remove particles, colloids, ionic species and organic substances and/or molecules.

Water purification apparatus generally allow manual variation by a user of the volume of water to be dispensed, such as from drops to liters, and/or the speed (i.e. flow rate) of water dispense, again from drop-wise to a number of liters per minute.

However, as well as manual dispensing based on a user physically operating a tap and manually gauging the volume of water being dispensed, frequently water purification apparatus provide for 'automatic dispensing', such as on a time basis or measured basis; optionally following a pre-programmed or pre-stored dispense profile as discussed in our WO2007/015048A1.

In order to accommodate such a range of dispensing options, the control of the water dispense outlet of water purification apparatus is often 'electronic', to automate this activity. Typically, a simple on/off solenoid-controlled valve is used. However, solenoids are limited in that the internal flow rate of the water dispense apparatus, and hence the flow rate of the dispense of the purified water stream, is conventionally set at a single and high value, and this does not allow for the easy dispense of slow or small volumes, particularly into smaller water collecting vessels such as beakers and flasks.

U.S. Pat. No. 5,925,240 describes a water treatment system having dosing control for providing treated water that can be accurately dispensed. In one embodiment, its controller converts an input signal to a motor control signal that causes the motor to operate at a speed which drives the pump and causes the flow of water at the outlet valve to correspond to the desired flow rate. In another embodiment of U.S. Pat. No. 5,925,240, the controller controls the outflow cross-section of a valve and causes the flow of water at the valve to correspond to the desired flow rate. However, both such embodiments involve increasing costs for additional solenoids and additional hydraulic complexity.

In order to overcome such limitations, but retain a good degree of dispense control, voltage or frequency dependent solenoids can be used, whereby adjustment of the coil, voltage or frequency adjusts the position of the armature, enabling some flow adjustment through such solenoid-controlled valves. However, such solenoids are still limited at very low and/or very accurate (such as drop wise) flows that can be desired or required when very precise volumes are to be dispensed. This is because on initial lifting of the valve diaphragm to start a dispense, the change in pressure on the valve diaphragm affects the delicate electronically-floating armature, leading to its incorrect positioning and therefore incorrect flow control.

A further disadvantage of solenoids is that in energising the activation coil of a solenoid over a long period, (such as during drop wise dispense for very accurate volume dispense), the heated coil causes undesirable localised heating of the passing purified water stream to occur, affecting the properties of the purified water stream.

SUMMARY OF THE INVENTION

It is an object of the present invention to provide a water purification apparatus and method which provide greater control of the dispense of the purified water.

Thus, according to one aspect of the present invention, there is provided a water purification apparatus comprising at least:

(a) one or more water purification components to provide a purified water stream, preferably having a conductivity of less than 1 μS/cm;

(b) a stepper motor to control the dispense of the purified water stream from the water purification apparatus.

Stepper motors are generally brushless synchronous electric motors that can divide a full rotation of an armature into a number of discrete steps, usually a large number of small steps. This can then provide very fine and accurate control of the dispense of the purified water stream from the water purification apparatus, which control is unaffected by the flow or flow rate of the purified water stream.

A stepper motor can rotate its armature to a number of rotational positions corresponding to the number of phases of the motor. Consequently a stepper motor with a large number of phases has the ability to position its armature into a large number of positions with a correspondingly small difference or change. As such positions are known and can be indexed, they provide very fine control of the water dispense operation.

Furthermore, once the armature has been positioned into a desired position for a particular dispense, the stepper motor will hold the armature in position, preventing any disruptive influence to occur to the dispense without the use of additional power or the generation of heat.

The water purification apparatus may comprise one or more valves for the dispense of the purified water stream. The motor may be coupled to one or more of such valves in such a manner that enables the motor to control the position of at least one of the valves, optionally each valve that directly affects the flow rate of the dispense. This allows the stepper motor to directly control the dispense of the purified water stream by controlling the position of the valve(s).

The motor may be operable to position a valve between at least a first open position and at least a second closed position, wherein in the first open position, the purified water stream is free to flow through the valve at a first flow rate, and in the second closed position, the purified water stream is prevented from flowing through the valve.

Preferably, the motor is operable to position a valve between at least a plurality of open positions as well as a closed position, wherein each open position allows purified water to flow through the valve at a different flow rate. Such flow rates can correspond to 'drop-wise', such as 20 ml/min, up to 1 l/min, 2 l/min, 5 l/min or more.

The motor may be further arranged to prevent displacement of one or more valves when positioned into a desired position.

The motor may be coupled to a valve via at least one of a cam mechanism or a gearing mechanism. The use of at least a gearing mechanism enables the motor to impart even finer control of the dispense of the purified water stream from the water purification apparatus by the use of the gearing ratio in a manner known in the art.

Thus, the present invention allows an electric motor, optionally with a servo controller and an integral production gearbox, to convert the rotational energy of the motor into a precise linear movement. The degree of movement can be controlled by adjusting the electrical conditions.

The motor may be controlled using any suitable controller, being directly or indirectly operable by a user, generally being an input device. Typically, the motor will be activated and/or controlled via a manual input device such as a button or rotational control, which converts the user's hand operation into suitable electrical signals which then electronically operate the motor, and any associated dispense valve. Because the motor can control a drive shaft very precisely, typically through a reduction gearbox, any valve is held very firmly, so that the changes in pressure which occur when dispense begins, such as the valve beginning to open, does not affect the controllability of the dispense, unlike the situation on the variable solenoid where the armature is floating and not held rigidly.

The variations in possible relationships between a user's hand operation and suitable electrical signals are known in the art, and can include varying the timing, speed, degree and/or amount of the control of the motor in relation to a user's hand movement or operation via one or more pre-programmed operations or algorithms or other relationships into the proportional electrical signals to operate the control of the water dispense.

For example, the degree of a user's hand operation may provide a non-linear and/or dampened control to create a suitable electrical signal to proportionally control the motor by the required amount.

The advantages of the present invention include the use of relatively low cost electronic motors/servos, the possibility of extremely precise operation, even at very low flow rates, and no heat build up by the use of such a motor, avoiding any unintended heat transfer to the purified water stream being dispensed.

Where the water purification apparatus includes a pump, control of the motor may additionally be coupled with control of the pump, such as the pump speed. In this way, precise and fully adjustable dispense flow rates over the whole range of the water purification apparatus' operational flow rates can be achieved.

The stepper motor can include a threaded or otherwise helically-grooved axle. The shape and diameter of such an axle, and/or its throw and/or pitch, may be directly or indirectly proportional to the fineness of control that may be achieved.

The water purification apparatus of the present invention may comprise any number of water purification components, as well as other devices, parts, lines, etc, including but not limited to one or more of the following: pumps, meters, oxidisers, sensors, de-ionisers, valves, drains, controllers, taps, reservoirs, recirculation loops, filters and membranes. One or more of such components may be integral with the water purification apparatus, such as a pump, and one or more of such components may be separable from the water purification apparatus, such as an ion-exchange cartridge.

Water purification apparatus are known in the art, and are generally intended to provide purified water, preferably as a purified water stream, having a conductivity of less than 1 $\mu$S/cm, preferably less than 0.1 $\mu$S/cm, more preferably less than 0.067 $\mu$S/cm, at 25° C. This can be equated to the purified water stream having a resistivity of at least 1 M$\Omega$-cm, preferably at least 10 M$\Omega$-cm, more preferably at least 15 M$\Omega$-cm. Additionally, purity specifications can be made for organic species to content levels of less than 500 ppb of total organic carbon (TOC), preferably less than 50 ppb; bacteria to levels less than 100 colony forming units (cfu) per milliliter, preferably less than 1 cfu/ml; and for dissolved oxygen and/or particles.

Such water purification apparatus generally only provide up to 1000 liters of purified water per hour, such as up to 5 l/min.

Such water purification apparatus are generally 'stand alone' units, generally only requiring connection to nearby water and electricity supplies to be operable. Thus, they are generally independent and/or moveable units operating in or at a specific location such as a laboratory. Preferably, at least the majority of the purification actions or processes occur within a housing. They are intended to provide a purified water stream only, such stream not being in combination with any other substance or compound.

In general, a water purification apparatus includes a pump, an inlet, one or more de-ionisers, optionally one or more oxidisers, and a water outlet (for dispense of the purified water stream).

One common oxidiser involves the use of ultraviolet light, and the ultraviolet treatment of water for decomposing organic compounds or substances in water is well known in the art. Apparatus and instruments for providing suitable ultraviolet light are well known in the art, and typically involve emitting ultraviolet light at one or more specific wavelengths in an area or space through which the water passes. The or each oxidiser can be provided as a distinct component, typically a separable component such as a replaceable cartridge, having an ultraviolet emitter therein around which the water stream passes from an inlet to an outlet. The purification of water in the present invention may involve one or more oxidisers, being in series, parallel or both.

Ionic species in the feedwater (and created by any oxidiser(s)) are generally removed from the water stream to provide purified water by the use of one or more de-ionisers. Many types and forms of de-ioniser are known in the art, and include, but are not limited to, one or more of the following; (electro)deionisation apparatus or units, reverse osmosis (RO) units or apparatus, membranes, filters, ion exchange resins and zeolites. The action and operation of de-ionisers is well known in the art, and they are not further described in detail herein.

The water purification apparatus may comprise a plurality of ion-exchangers, including one or more "pre-treatment" ion exchangers upstream of any oxidiser, as well as one or more ion-exchangers downstream of any oxidiser.

The dispense of at least a portion of the purified water from the water purification apparatus can be provided through any form or type of outlet or outlets, optionally being co-ordinated or separate.

The water purification apparatus may have a dispense mode or other such form of operation, and a recirculation mode. Preferably, the or each point of dispense of the purified water involves at least one valve and motor, more preferably operable between a dispense position and a recirculating position. One or more valves may also provide control over the volume and/or rate of flow of the purified water at the dispense.

The movement of water through a water purification apparatus is generally provided by the use of one of more pumps known in the art. The nature and operation of a pump is not further discussed in detail herein.

The present invention encompasses all combinations of various embodiments or aspects of the invention described herein. It is understood that any and all embodiments of the present invention may be taken in conjunction with any other embodiment to describe additional embodiments of the present invention. Furthermore, any components of an embodiment may be combined with any and all other components from any of the embodiments to describe additional embodiments.

BRIEF DESCRIPTION OF THE DRAWINGS

Embodiments of the present invention will now be described by way of example only and with reference to the accompanying drawings in which:

FIG. 2 is a diagrammatic part cross-sectional part perspective view of a water dispense arrangement from the water purification apparatus of FIG. 1.

DESCRIPTION OF THE PREFERRED EMBODIMENTS

Figure 1:
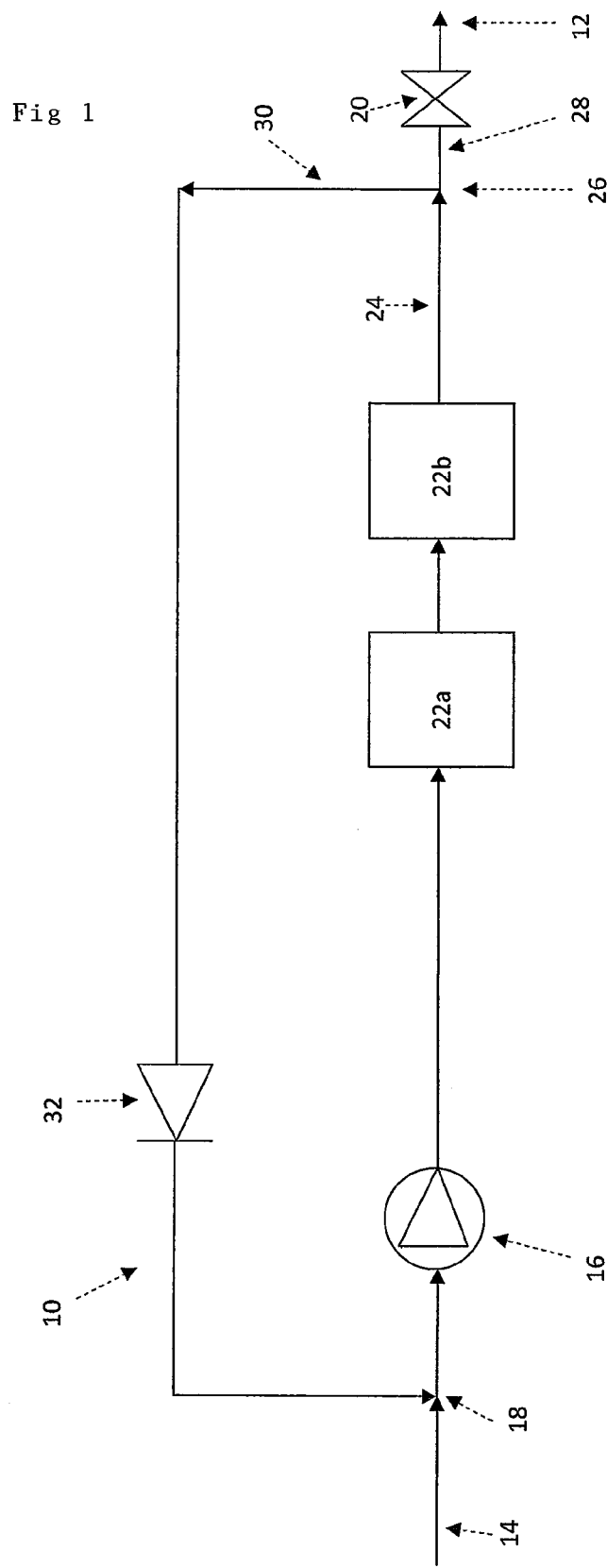
FIG. 1 is a diagrammatic perspective view of the water purification apparatus according to one embodiment of the present invention.

Referring to the drawings, FIG. 1 shows a water purification apparatus 10. The water purification apparatus 10 comprises one or more water purification components such as those described hereinabove. Such components may be integral and/or separable from a housing (not shown).

Separable components include ion-exchange cartridges and UV cartridges known in the art, but the present invention is not limited by the number, nature or location of the water purification components. The operations of water purification components are well known to those skilled in the art, and are generally intended to reduce and/or remove contaminants and impurities in water provided from a water input, so as to provide a purified water stream from at least one water dispense outlet.

Water purification components can include physical, magnetic, electrical and/or light-based components in any arrangement or line-up known in the art.

The water purification apparatus 10 is typically intended to be located on or near a work bench, optionally supported thereby or self-supporting. A water purification apparatus may include one or more water inlets, generally from a single source such as a tap or other potable water supply, to provide a purified water stream to one or more water dispense outlets or points.

FIG. 1 shows a water purification apparatus 10 with a single water dispense outlet 12 integral with the water purification apparatus 10, by way of example only. Water dispense points can be movable relative to the main parts of the water purification apparatus 10, such as to any housing, and/or they can be located in remote locations such as through water supply piping or conduits such as a ring main to one or more remote locations, such as a separate room, workbench or laboratory.

FIG. 1 shows an incoming water stream 14, available from a water source or the like, which passes through a pump 16. From the pump 16, the water stream passes through one or more water purification components. FIG. 1 shows, by way of example only, two water purification components 22a, 22b, which could comprise an oxidiser such as an ultraviolet light emitter, followed by an ion-exchanger, adapted to remove the ionic species in the feed water as well as those created by the oxidiser; and so to purify the water stream.

The so-formed purified water stream 24 passes through a first tee-piece 26 to be provided as a purified water stream 28, available to the dispense outlet 12 via a dispense valve assembly 20 in a conduit 50.

FIG. 1 also shows a recirculation loop 30 extending from the first tee-piece 26 through a one way valve 32 to a second tee piece 18. Recirculation loops are well known in the art, and commonly provide maintenance of the purity of the purified water stream 24 during periods of non-dispense from the water purification apparatus 10 operating continuously or intermittently.

FIG. 2 shows a cross-sectional view of the final portion of FIG. 1, wherein the purified water stream 28 is able to pass to the dispense outlet 12, whether for direct dispense as a point of use or for subsequent passage to one or more separate water dispense points, through conduit 50 by the operation of a dispense valve 34 as part of the dispense valve assembly 20. The dispense valve 34 can be positioned between a number of distinct or indexed open positions, and a closed position. In the open positions, the purified water stream 28 can pass to the dispense outlet 12 at different flow rates. In the closed position, the flow of the purified water stream 28 is restricted by the dispense valve 34 against a valve housing 56 such that the water is prevented from passing to the dispense outlet 12.

The dispense valve 34 comprises an axle 42 attached to a restrictor element 46 moveable within the conduit 50. A plurality of evenly spaced recesses 52 such as a screw thread is defined along the surface of the axle 42. The axle is held in one or more fixed and correspondingly threaded axle-holders (not shown).

As shown in FIG. 2, part of the restrictor element 46 is located within the conduit 50, to define a flow channel 51 thereinbetween. The axle 42 is able to undergo linear movement along the axle-holder(s) to selectively locate a desired portion of the restrictor element 46 within the conduit 50. The size of the flow channel 51 is dependant on the portion of the restrictor element 46 located within the conduit 50. The size of the flow channel 51 may be reduced by moving the axle 42 linearly downwards to locate a greater portion of the restrictor element 46 within the conduit 50 against the valve housing 56. When the axle 42 is moved fully downwards, the restrictor element 46 fully meets with the valve housing 56 and fills the conduit 50; in this state the dispense valve 34 is in a fully closed position.

Conversely, moving the axle 42 linearly upwards will remove part or all of the restrictor element 46 from the conduit 50, thereby increasing the size of the flow channel 51. When the axle 42 is moved fully upwards, optionally such the restrictor element 46 is fully outwith the conduit 50, the dispense valve 34 is in a fully open position. Consequently, the position of the dispense valve 34 is controlled by linear movement of the axle 42. As the greater the size of the flow channel 51 the larger volume of water that can flow within the conduit 50, the rate of flow of the purified water 28 to dispense outlet 12 may be controlled by means of the linear movement of the axle 42.

The linear position of the axle 42 can be controlled by a stepper motor 35 shown in FIG. 2, generally having a number of electromagnets 36 arranged around a threaded rotor 37 on the axle 42.

Operation of the stepper motor 35 provides rotational movement of the rotor 37 and so the axle 42. The stepper motor 35 may be operated to effect clockwise or anti-clockwise rotation of the rotor 37 and axle 42.

A user may operate the stepper motor 35 by means of an input device 54 such as a rotating button, keypad, touch sensitive pad, etc operable by a user. The input device 54 provides, upon activation by a user, direct or indirect electrical signals to the electromagnets 36 on the armature of the stepper motor 35 to effect operation of the stepper motor 35. The activation and/or operation of the input device 54 may be relayed to the stepper motor 35 in a direct and/or proportional and/or variable and/or delayed relationship. For example, the degree of rotation of a rotational input device may be amplified or dampened before operating the stepper motor 35.

In this way, rotational movement of the rotor 37 will effect linear movement of the axle 42 via the threading with fixed the axle holder(s).

To increase the rate of flow of the purified water stream 28 passing to the water dispense outlet 12, the stepper motor 35 is operated to affect the relevant rotation of the axle 42, and so also cause the axle 42 to undergo an upward linear movement. As the axle 42 moves upwards a portion of the restrictor element 46 will be removed from the conduit 50 to increase the size of the flow channel 51, thereby permitting a larger volume of purified water 28 to flow through dispense outlet 12. Once the desired flow is achieved at the dispense outlet 12 the stepper motor 35 could be stopped manually by the user, or stopped by a pre-determined or pre-programmed limit.

Conversely, to decrease the rate of flow of purified water stream 28 to pass to the water dispense outlet 12, the stepper motor 35 is operated to cause the axle 42 to undergo a downward linear movement. As the axle 42 moves downwards a larger portion of the restrictor element 46 will be positioned into the conduit 50 to decrease the size of the flow channel 51, thereby permitting a smaller volume of purified water 28 to flow to the dispense outlet 12. Once the desired flow is achieved at the dispense outlet 12 the stepper motor 35 is stopped by the user and/or stopped by a pre-determined or pre-programmed limit.

One advantage of use of the stepping motor 35 is that the number of phases of the stepper motor 35 is directly proportional to the number of discrete or distinct rotational positions of the rotor 37. Consequently, the number of phases of the stepper motor relates to the number of positions at which the axle 42 may be located by the stepper motor 35 and any associated gear assembly (not shown). Using a stepper motor 35 with a significant number of phases will therefore permit very fine and accurate control of the flow of purified water stream 28 passing through the conduit 50 to the dispense outlet 12.

Furthermore, the arrangement and operation of the stepper motor 35 and dispense valve 34 are such that water pressure acting upon the restricting element 46 (such as caused by the pressure of the pump 16 in the water purification apparatus 10), either in general, and/or as the purified water stream 28 flows through the conduit 50, does not move or otherwise displace the restrictor element 46. Thus, the accuracy of the passage of the purified water stream 28 through the passage 51 can be very accurately maintained by the present invention.

The stepper motor may be arranged to ensure that the position of the dispense valve 34 is maintained during use. Once the dispense valve 34 has been located at a desired position, the axle 42 can be held in its current position by friction.

The input device 54 may be in the form of, for example, a potentiometer, a keypad, one or more push buttons, an angle encoder and the like. The input device 54 permits a user to easily provide an electrical signal to the stepper motor 35 such that the stepper motor 35 is operated to position the dispense valve 34 into a desired position. The input device 54 may allow a user to enter a desired fluid dispensing rate (e.g. 1 liter/min or 0.1 ml/sec), which can be calibrated to provide a corresponding electrical signal to the stepper motor 35 so that the dispensing valve 34 is moved to a position wherein the desired dispersion rate at the dispense outlet 12 is achieved. An angle encoder may be used to achieve such an effect.

In this way, either the user or a controller involved in the automatic dispense, is able to relate the input information of the user, such as the degree of rotation of an angle encoder, with the dispense valve 34 to a very accurate degree.

In a first alternative arrangement, the input instruction of the user is not directly proportional to movement of the dispense valve 34. For example, the water purification apparatus 10 may allow any initial significant input by the user, such as large angular movement to be varied, such as delayed and/or dampened, in proportion to the movement of the dispense valve 34. Thus, accidental over-input or movement by a user does not immediately relate to over-movement of the dispense valve 34 and thus possible ruin of the dispense operation.

One or more variations of the movement of the dispense valve 34 in relation to the input by the user can be provided so as to vary the dispense operation and/or profile depending either upon the known or expected dispense input being provided, and/or to avoid unexpected input. The use of one or more controllers in a water purification apparatus is known to those skilled in the art, and the operation of such controller(s) to affect a variation between input signal and movement of the dispense valve 34, is well known to those skilled in the art.

It will be appreciated that although specific embodiments of the invention have been described herein for the purposes of illustration, various modifications may be made without deviating from the spirit of the scope of the invention.

The invention claimed is:

1. A water purification apparatus comprising at least:
   (a) a pump;
   (b) one or more water purification components provided downstream of the pump to provide a purified water stream having a conductivity of less than 1 µS/cm;
   (c) a stepper motor to control the dispense of the purified water stream from the water purification apparatus; and
   (d) a dispense valve provided at a dispense outlet downstream of all the water purification components for controlling the dispense of the purified water stream from the dispense outlet, the dispense valve acting on a conduit containing the purified water stream, the dispense outlet being open to atmospheric pressure,
   wherein the stepper motor is coupled to the valve to control the position of the valve,
   wherein the valve comprises an axle attached to a restrictor element moveable within the conduit, the axle having a plurality of evenly spaced recesses in the form of a screw thread defined along the surface of the axle, the axle being held in one or more fixed and correspondingly threaded axle-holders, the position of the dispense valve being controlled by linear movement of the axle, the linear position of the axle being controlled by the stepper motor,
   wherein part of the restrictor element is located within the conduit, to define a flow channel thereinbetween,
   wherein the axle is able to undergo linear movement along the axle-holder(s) to selectively locate a desired portion of the restrictor element within the conduit,
   wherein the stepper motor is operable to position the valve between a plurality of open positions wherein the purified water stream is free to flow through the valve and a closed position wherein the purified water stream is prevented from flowing through the valve,
   wherein the size of the flow channel is dependant on the portion of the restrictor element located within the conduit, such that the size of the flow channel may be reduced by moving the axle linearly towards the valve housing to locate a greater portion of the restrictor element within the conduit against the valve housing, and such that in the closed position when the axle is moved fully towards the valve housing, the restrictor element fully meets with the valve housing and fills the conduit, wherein in the open positions moving the axle linearly away from a valve housing removes part or all of the restrictor element from the conduit, thereby increasing the size of the flow channel, wherein when the axle is moved fully upwards the dispense valve is in a fully open position, wherein each open position allows purified water to flow through the valve and from the dispense outlet at a different flow rate, a first open position allowing purified water to flow through the valve at a drop-wise flow rate of 20 ml/min, and a second open position allowing purified water to flow through the valve at a flow rate of 1 l/min.

2. Apparatus as claimed in claim 1 wherein the stepper motor is coupled to the valve via at least one of a cam mechanism or a gearing mechanism.

3. Apparatus as claimed in claim 2 wherein the stepper motor comprises an electric motor with a servo controller and an integral production gearbox.

4. Apparatus as claimed in claim 1 wherein the stepper motor includes a reduction gearbox.

5. Apparatus as claimed in claim 1 wherein the stepper motor is activated and/or controlled via a manual button or rotational control.

6. Apparatus as claimed in claim 1 comprising varying the timing, speed, degree and/or amount between control of the stepper motor and control of the water dispense.

7. Apparatus as claimed in claim 1 wherein the stepper motor has a rotor and has a number of phases directly proportional to a number of discrete rotational positions of the rotor.

* * * * *